US010079465B1

(12) United States Patent
Slagle et al.

(10) Patent No.: US 10,079,465 B1
(45) Date of Patent: Sep. 18, 2018

(54) COHERENT AMPLIFICATION USING PHASE MODULATION MEDIATED TWO-BEAM COUPLING

(71) Applicant: The United States of America, as represented by the Secretary of the Air Force, Washington, DC (US)

(72) Inventors: Jonathan Eric Slagle, New Carlisle, OH (US); Joy Elizabeth Haley, Dayton, OH (US); Shekhar Guha, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 15/668,078

(22) Filed: Aug. 3, 2017

(51) Int. Cl.
*H01S 3/23* (2006.01)
*H01S 3/067* (2006.01)
*H04L 27/20* (2006.01)
*H04L 27/233* (2006.01)
*H01S 3/13* (2006.01)
(Continued)

(52) U.S. Cl.
CPC ........ *H01S 3/06712* (2013.01); *H01S 3/0092* (2013.01); *H01S 3/06754* (2013.01); *H01S 3/1307* (2013.01); *H01S 3/2308* (2013.01); *H04L 27/2014* (2013.01); *H04L 27/2278* (2013.01); *H04L 27/2332* (2013.01)

(58) Field of Classification Search
CPC .................................................. H01S 3/2308
See application file for complete search history.

(56) References Cited

U.S. PATENT DOCUMENTS 4,451,151 A * 5/1984 Huignard ............... G01C 19/64
250/227.19
4,750,153 A 6/1988 Owechko et al.
(Continued)

FOREIGN PATENT DOCUMENTS

WO WO2008125142 A1 10/2008

OTHER PUBLICATIONS

P.-A. Blanche1 et al., Advances in Photorefractive Polymers and Applications, Proc. of SPIE vol. 9564, Sep. 5, 2015.
(Continued)

*Primary Examiner* — Michael Carter
(74) *Attorney, Agent, or Firm* — AFMCLO/JAZ

(57) ABSTRACT

A coherent amplification device includes a phase modulation stage for preconditioning a laser beam, and a coupling stage for transferring energy and spatial phase information between the first laser beam and a second laser beam. The phase modulation stage may include an electro-optically active medium having a time-dependent refractive index manipulatable by an electric field thereby introducing a time-dependent phase shift to the first laser beam when passed therethrough. The coupling stage may include a coupling medium having a time-dependent and intensity-dependent refractive index with a finite lifetime, where an interference pattern of the laser beams is written into the coupling medium through the time-dependent and intensity-dependent refractive index to generate a holographic grating based on the interference pattern, and where the finite lifetime of the coupling medium and the preconditioned phase modulation facilitates a transfer of energy and spatial phase information between the laser beams.

23 Claims, 4 Drawing Sheets

(51) Int. Cl.
*H01S 3/00* (2006.01)
*H04L 27/227* (2006.01)

(56) References Cited

U.S. PATENT DOCUMENTS

| | | | |
|---|---|---|---|
| 4,983,024 | A | 1/1991 | Boothroyd et al. |
| 5,072,314 | A | 12/1991 | Chang |
| 5,396,368 | A | 3/1995 | Khoshnevisan et al. |
| 5,706,084 | A | 1/1998 | Gutierrez |
| 5,717,516 | A | 2/1998 | Klein et al. |
| 6,741,388 | B2 | 5/2004 | Javanovic et al. |
| 7,239,777 | B1 | 7/2007 | Christensen et al. |
| 7,667,851 | B2 | 2/2010 | Dubois et al. |
| 7,684,047 | B2 | 3/2010 | Drake et al. |
| 8,184,361 | B2 | 5/2012 | Rothenberg et al. |
| 8,798,104 | B2 | 8/2014 | Nathan |
| 8,830,566 | B2 | 9/2014 | Rothenberg et al. |
| 8,958,145 | B2 | 2/2015 | Rothenberg |
| 9,001,853 | B2 | 4/2015 | Kane |
| 9,042,009 | B2 | 5/2015 | Papadopoulos et al. |
| 9,164,479 | B2 | 10/2015 | Das et al. |
| 9,503,196 | B2 | 11/2016 | Galvanauskas |

OTHER PUBLICATIONS

Sutherland, Richard L., Handbook of Nonlinear Optics, 2nd edition, 2003, ISBN: 0-8247-4243-5, p. 301.

Dutton et al., Picosecond degenerate two-wave mixing, vol. 9, No. 10/Oct. 1992/J. Opt. Soc. Am. B, pp. 1843-1849.

Dogariu et al., Purely refractive transient energy transfer by stimulated Rayleigh-wing scattering, J. Opt. Soc. Am. B/ vol. 14, No. 4/ Apr. 1997, pp. 796-803.

Tang et al., Time-domain theory for pump—probe experiments with chirped pulses, J. Opt. Soc. Am. B/ vol. 14, No. 12/ Dec. 1997, pp. 3412-3423.

Slagle et al., Degenerate frequency two-beam coupling in organic media via phase modulation with nanosecond pulses, vol. 33, No. 2 / Feb. 2016 / Journal of the Optical Society of America B, pp. 180-188.

Koukourakis et al., Photorefractive two-wave mixing for image amplification in digital holography, Oct. 24, 2011 / vol. 19, No. 22 / Optics Express, pp. 22004-22023.

Chiou et al., Beam cleanup using photorefractive two-wave mixing, Dec. 1985 / vol. 10, No. 12 / Optics Letters, pp. 621-623.

Silverberg et al., Optical instabilities in a nonlinear Kerr medium, J. Opt. Soc. Am. B/vol. 1, No. 4/Aug. 1984, pp. 662-670.

Pochi Yeh, Exact solution of a nonlinear model of two-wave mixing in Kerr media, vol. 3, No. 5/May 1986/J. Opt. Soc. Am. B, pp. 747-750.

* cited by examiner

US 10,079,465 B1

COHERENT AMPLIFICATION USING PHASE MODULATION MEDIATED TWO-BEAM COUPLING

STATEMENT OF GOVERNMENT INTEREST

The invention described herein may be manufactured, used, and licensed by or for the Government of the United States for all governmental purposes without the payment of any royalty.

BACKGROUND

The phenomenon of two-beam coupling (TBC), which is also known as two-wave mixing (TWM), may provide a discriminator for separating coherent from incoherent light, thus maintaining fidelity in the phase information. As such, two-beam coupling is a coherent light discriminator and may therefore be used for applications such as beam combining, image amplification, and digital holography.

Although coherent amplification may have almost unlimited applications in the field of photonics, in most prior art systems, only photorefractive materials have been used for this purpose. Photorefractive materials may generally initiate two-beam coupling by mechanisms involving charge diffusion, the application of external electric fields (e.g., direct current (DC) electric fields), and have a large-scale order (e.g., crystallinity). Each of these features introduce certain limitations on the applicability of this technique. As such, there remains a need for improved devices, systems, and methods for coherent amplification, e.g., without using photorefractive materials.

SUMMARY

A coherent amplification device includes a phase modulation stage for preconditioning a laser beam traveling therethrough, and a coupling stage for transferring energy and spatial phase information between a first laser beam and a second laser beam. The phase modulation stage may include at least a first electro-optically active medium structurally configured for passing at least the first laser beam therethrough, the first electro-optically active medium having a time-dependent refractive index manipulatable by an electric field to change the time-dependent refractive index thereby introducing a time-dependent phase shift to the first laser beam when the first laser beam is passed therethrough. The coupling stage may include a coupling medium including a time-dependent and intensity-dependent refractive index with a finite lifetime, where an interference pattern of the first laser beam and the second laser beam overlapping within the coupling medium is written into the coupling medium through the time-dependent and intensity-dependent refractive index to generate a holographic grating based on the interference pattern, and where the finite lifetime of the coupling medium and the preconditioning of at least the first laser beam facilitates a transfer of energy and spatial phase information between the first laser beam and the second laser beam.

A method includes passing a first laser beam through a first electro-optically active medium, changing a time-dependent refractive index of the first electro-optically active medium, introducing a time-dependent phase shift to the first laser beam, overlapping the first laser beam with a second laser beam within a coupling medium including a time-dependent and intensity-dependent refractive index with a finite lifetime, writing an interference pattern of the first laser beam and the second laser beam into the coupling medium through the time-dependent and intensity-dependent refractive index, generating a holographic grating in the coupling medium based on the interference pattern, and transferring energy and spatial phase information between the first laser beam and the second laser beam facilitated by the finite lifetime of the coupling medium and the time-dependent phase shift to at least the first laser beam.

A system includes one or more laser sources, a phase modulation stage for preconditioning a laser beam, and a coupling stage for transferring energy and spatial phase information between the first laser beam and a second laser beam. The phase modulation stage may include at least a first electro-optically active medium structurally configured for passing at least a first laser beam from the one or more laser sources therethrough, the first electro-optically active medium having a time-dependent refractive index manipulatable by an electric field to change the time-dependent refractive index thereby introducing a time-dependent phase shift to the first laser beam when the first laser beam is passed therethrough. The coupling stage may include a coupling medium including a time-dependent and intensity-dependent refractive index with a finite lifetime, the coupling medium structurally configured such that an interference pattern of the first laser beam and the second laser beam overlapping within the coupling medium is written into the coupling medium through the time-dependent and intensity-dependent refractive index to generate a holographic grating based on the interference pattern, where the finite lifetime of the coupling medium and the preconditioning of at least the first laser beam facilitates a transfer of energy and spatial phase information between the first laser beam and the second laser beam.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
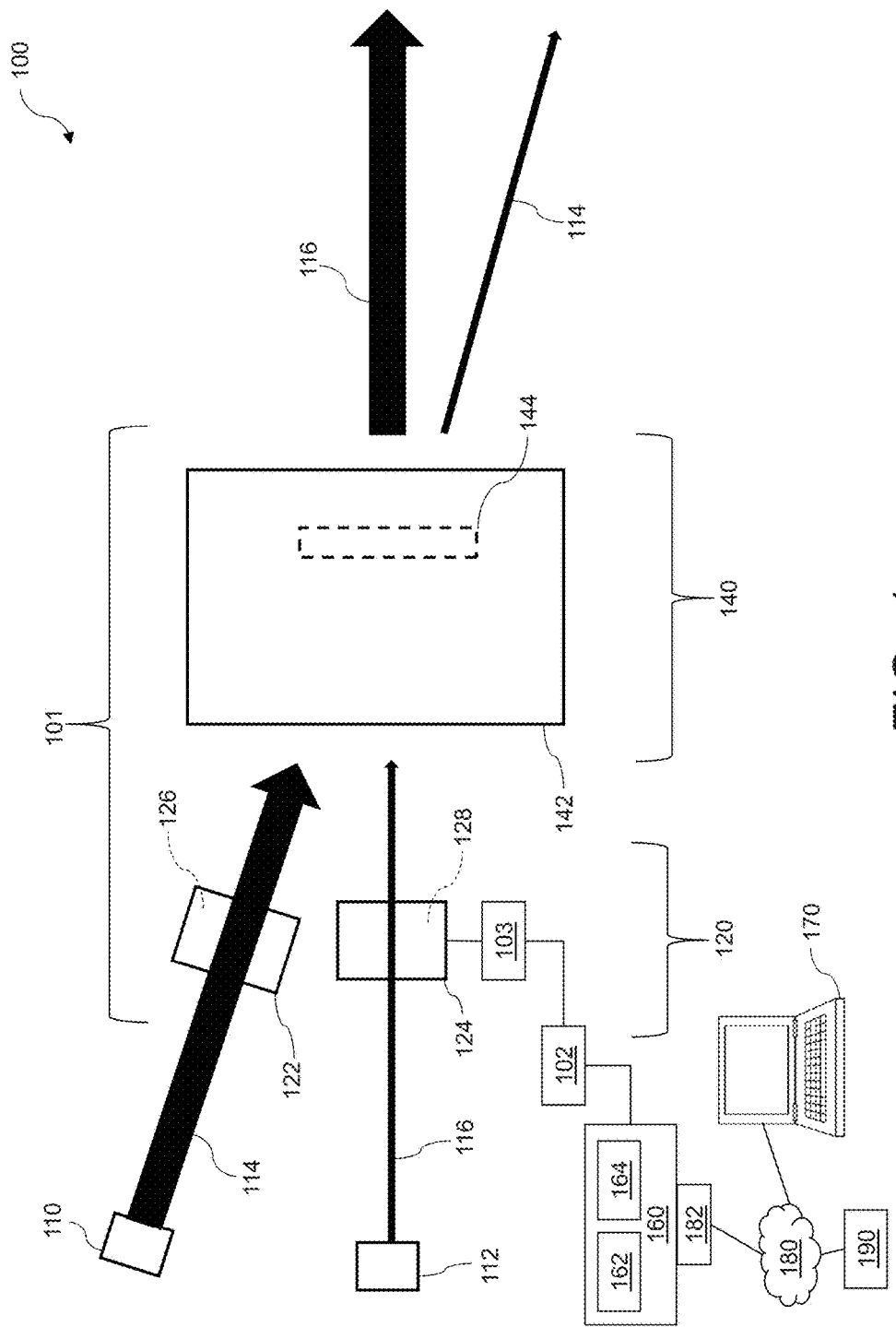
FIG. 1 illustrates a coherent amplification system, in accordance with a representative embodiment.

The various methods, systems, apparatuses, and devices described herein generally provide for coherent amplification, and more specifically, coherent amplification using phase modulation mediated two-beam coupling.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In general, the devices, systems, and methods described herein may be configured for, and may include, coherent amplification. More specifically, the present disclosure includes devices, systems, and methods for coherent amplification using phase modulation mediated two-beam coupling.

As discussed above, the phenomenon of two-beam coupling (TBC), also known as two-wave mixing (TWM), is a coherent interaction between two electric fields in which energy is transferred from one at the expense of the other, and where the phase of the amplified field is conserved. Thus, two-beam coupling is generally a coherent light discriminator (separating coherent light from incoherent light and thus maintaining fidelity in the phase information) that can be used in photonic applications such as holography, laser beam combing, and image amplification.

The process of two-beam coupling generally includes writing a dynamic refractive index grating into a medium. When two mutually coherent electric fields overlap in space, an interference pattern is created. If the medium is electro-optically active, i.e., if its refractive index can be manipulated by an electric field, then the interference pattern may then be written into the medium in the form of a refractive index modulation or grating.

In contrast to other holographic techniques that generally require a third field to read the grating, two-beam coupling includes the exchange of energy between just two electric fields and as a result it may require a substantially coherent interaction. That is, the fields themselves, the interference pattern they produce, and the resultant grating may all need to be mutually coherent and present simultaneously. If the interference pattern and the grating are exactly in phase, either traveling in space or fixed, there may be nothing to direct one field in the direction of the other field. Consequently, if there is a non-zero phase shift between the grating and the interference pattern, then the fields should experience the mismatch and energy may be transferred. This can be directly derived from the wave equation—see, e.g., Yeh, P., "Exact solution of a nonlinear model of two-wave mixing in Kerr media," J. Opt. Soc. Am. B, Vol. 3, pp. 747-50 (1986) (hereinafter "Yeh"), which is hereby incorporated by reference.

As discussed above, generating the phase shift while maintaining coherence may be achieved through the use of the photorefractive effect. To this end, photorefractive materials may initiate two-beam coupling by way of a mechanism involving charge diffusion, externally applied electric fields, and large scale, non-centrosymmetric order such as crystallinity or polymer dispersion. The basic process may include the following: (1) light is absorbed in the material which generates charge carriers, i.e., electrons and holes; (2)

the charge carriers aided by the external electric field diffuse into the bright and dark areas of the interference pattern; (3) this periodic separation of charge generates a space-charge field that oscillates in phase with the interference pattern; and (4) the space-charge field generates a change in the refractive index by way of the Pockels effect, which by virtue of its own physics is exactly 90 degrees out of phase with the interference pattern thus allowing two-beam coupling.

An advantage to the aforementioned method may include that the Pockels effect is a linear electro-optic process and therefore these gratings can be created with relatively modest field intensities. Another advantage of the aforementioned method may include that the charge diffusion, which facilitates the Pockels effect, is persistent long after the light is removed since the recombination of the charge can be very long, thus allowing for holographic storage. Yet another advantage of the aforementioned method may include that the phase shift between the grating and interference pattern may be automatically optimized at 90 degrees. However, there are some disadvantages to the aforementioned method. For example, charge diffusion is a relatively slow process, which can limit the applicability, see, e.g., the description of "reciprocity failure" in P. A. Blanche et al., "Advances in Photorefractive Polymers and Applications," LIGHT MANIPULATING ORGANIC MATERIALS AND DEVICES II, Vol. 9564 (2015), which is hereby incorporated by reference. Additionally, the external electric field and large-scale order, e.g. crystallinity, may place limitations on the size, shape, and optical quality of the medium.

Coherent amplification as disclosed herein may use a different approach to the photorefractive techniques described above. Specifically, disclosed herein are techniques for phase modulation mediated two-beam coupling, e.g., using a system similar to that shown in FIG. 1.

FIG. 1 illustrates a coherent amplification system, in accordance with a representative embodiment. The system 100 may include one or more laser sources (e.g., a first laser source 110 and a second laser source 112) and a coherent amplification device 101. In general, the coherent amplification device 101 may include at least two stages: (1) a phase modulation stage 120 for preconditioning one or more laser beams (e.g., a first laser beam 114 and a second laser beam 116), and (2) a coupling stage 140 for transferring energy and spatial phase information between laser beams, e.g., between the first laser beam 114 and the second laser beam 116. In general, the phase modulation stage 120 may include temporal preconditioning and the coupling stage 140 may include spatial coupling. Also, each of the phase modulation stage 120 and the coupling stage 140 may be structurally configured to preserve a phase of one or more of the first laser beam 114 and the second laser beam 116 through the coherent amplification device 101.

Although this disclosure may refer to "laser beams" when describing the coherent amplification techniques disclosed herein, one of ordinary skill will understand that other electrical fields or energy fields may also or instead be used in the techniques disclosed herein. Thus, the term "laser beam" as used throughout this disclosure, unless explicitly stated to the contrary or otherwise clear from the context, shall include without limitation a laser beam as commonly referred to in the art, as well as any electromagnetic field, beam of light, electric field, energy field, and combinations thereof.

Some principles of the coherent amplification system 100 of FIG. 1 will now be discussed.

When at least two fields (e.g., the laser beams) generate an interference pattern in a Kerr medium, the nonlinear refractive index of that medium may result in a refractive index grating with substantially the same modulation period of the interference pattern. However, if the nonlinear refractive index has a finite lifetime, e.g., redistribution of population via electronic transitions, the grating may lag in time relative to the interference pattern thus allowing for asymmetric, coherent energy transfer. A prerequisite for two-beam coupling in Kerr media may include having non-degenerate frequencies between the interacting fields, which may ensure that the refractive index grating is not standing, e.g., temporally static.

A two-beam coupling setup of the prior art may include some limitations to the degree of amplification as the necessary non-degeneracy occurs from, e.g., explicitly different frequencies for the interacting fields (e.g., in the case of Yeh, referenced above), frequency chirping picosecond laser pulses (see, e.g., Dogariu, A., et al., "Purely refractive transient energy transfer by stimulated Rayleigh-wing scattering," J. OPT. SOC. AM. B, Vol. 14, pp. 796-802 (1997), which is hereby incorporated by reference), or relying on the asymmetric accumulation of self-phase modulation in the coupling medium (see, e.g., Dutton, T. E., et al., "Picosecond degenerate two-wave mixing," J. OPT. SOC. AM. B, Vol. 9, pp. 1843-49 (1992), which is hereby incorporated by reference). In contrast, using coherent amplification techniques according to the present teachings, the system 100 may optimize the degree of non-degeneracy via phase modulation by first writing this into one or more of the fields, i.e., separately from the coupling event. This preconditioning may allow for the most efficient temporal overlap of the fields inside the coupling stage and thus can result in the most efficient energy transfer.

The coherent amplification techniques disclosed herein may thus provide a number of advantages, some of which are provided below by way of example and not of limitation. First, the techniques can originate with frequency degenerate fields, e.g., a single beam split in two, and significantly smaller frequency bandwidth in the laser beams, and consequently longer pulse widths, than picosecond pulses which can become critical in accumulation of modulation depth and coupling efficiency in the coupling stage. Additionally, the coherent amplification techniques disclosed herein may be used to control the direction of energy transfer by structuring the phase modulation stage 120 (the preconditioning stage) ahead of the coupling stage 140, i.e., where the phase modulation stage 120 is disposed upstream from the coupling stage 140 in a coherent amplification device 101. Further, the coherent amplification techniques disclosed herein may be performed in centrosymmetric or isotropic media, and thus may not require crystallinity—therefore the size, shape, and optical quality of the system 100 and coherent amplification device 101 can be advantageous compared to prior art systems and techniques. Additionally, using the coherent amplification techniques disclosed herein, the nonlinearities may be entirely passive, thus requiring no additional, external electric fields, thereby simplifying fabrication of the system 100 or coherent amplification device 101. Further, using the coherent amplification techniques disclosed herein, the gratings can be formed sub-nanosecond and can be sustained for many milliseconds (if necessary or advantageous), thus greatly enhancing the temporal responsivity and bandwidth of potential applications of the system 100 and coherent amplification device 101. Thus, the coherent amplification techniques disclosed herein may provide for fast (e.g., sub microsecond), coherent amplification which has enumerable application potential and has been difficult to achieve with photorefractive materials.

Turning back to the components of the system 100, the laser source in the system 100, e.g., the first laser source 110 and the second laser source 112, may include any source capable of producing the laser beam as that term is described herein. The laser source may include a substantially collimated laser light source, a broadband source, a multi-line laser source, a supercontinuum laser source, and combinations thereof. For example, the laser source may include one or more of an arc lamp, a light emitting diode, an infrared glower, and the like.

The coherent amplification device 101 may include a phase modulation stage 120 for preconditioning a laser beam traveling therethrough. To that end, the phase modulation stage 120 may include one or more electro-optically active mediums, e.g., a first electro-optically active medium 122 and a second electro-optically active medium 124 as shown in FIG. 1. More or less electro-optically active mediums are possible.

One or more of the electro-optically active mediums may be structurally configured for passing at least one laser beam therethrough. For example, as shown in the figure, the first electro-optically active medium 122 may be structurally configured for passing the first laser beam 114 therethrough, and the second electro-optically active medium 124 may be structurally configured for passing the second laser beam 116 therethrough, e.g., for preconditioning each of the first laser beam 114 and the second laser beam 116 before entering the coupling stage 140. In other implementations, as described herein, only one of the laser beams is preconditioned, or each laser beam is preconditioned in a single electro-optically active medium.

One or more of the electro-optically active mediums may have a time-dependent refractive index manipulatable by an electric field to change the time-dependent refractive index thereby introducing a time-dependent phase shift to a laser beam when the laser beam is passed therethrough. For example, this may be accomplished by either passively generating self-phase modulation in a separate Kerr medium, or actively modulating an electro-optically active crystal such as lithium niobate. In this manner, an electric field applied to the electro-optically active medium (passively or actively) may result in a change to the time-dependent refractive index, where the change to the time-dependent refractive index of the electro-optically active medium may then introduce a time-dependent phase shift to the laser beam when it is passed through the electro-optically active medium.

In some implementations, only a single electro-optically active medium is present in the coherent amplification device 101. The single electro-optically active medium may be used to precondition a single laser beam, or a plurality of laser beams. For example, each of the first laser beam 114 and the second laser beam 116 may be passed through the first electro-optically active medium 122 of the phase modulation stage 120.

In other implementations, two or more electro-optically active mediums are present in the coherent amplification device 101. For example, as shown in FIG. 1, the coherent amplification device 101 may include an electro-optically active medium for each laser beam to be coupled—a first electro-optically active medium 122 for preconditioning the first laser beam 114 and a second electro-optically active medium 124 for preconditioning the second laser beam 116. Thus, in certain implementations, the phase modulation stage 120 includes a second electro-optically active medium 124 for passing the second laser beam 116 therethrough, where the second electro-optically active medium 124 is structurally configured to precondition the second laser beam 116 by introducing a time-dependent phase shift into the second laser beam 116.

In this manner, the first electro-optically active medium 122 may have a first time-dependent refractive index 126 manipulatable by an electric field to change the first time-dependent refractive index 126 thereby introducing a time-dependent phase shift to the first laser beam 114 when the first laser beam 114 is passed therethrough, and the second electro-optically active medium 124 may have a second time-dependent refractive index 128 manipulatable by an electric field (e.g., a second electric field 103) to change the second time-dependent refractive index 128 thereby introducing a time-dependent phase shift to the second laser beam 116 when the second laser beam 116 is passed therethrough. The first electro-optically active medium 122 may be the same or similar to the second electro-optically active medium 124, e.g., having the same time-dependent refractive indexes. Alternatively, the first electro-optically active medium 122 may be different from the second electro-optically active medium 124, e.g., where the electro-optically active mediums have different time-dependent refractive indexes for applying different time-dependent phase shifts to laser beams passed therethrough.

Thus, in certain implementations, the system 100 includes a one-to-one ratio of electro-optically active mediums to laser beams as shown in the figure, although other implementations are possible where multiple laser beams pass through a single electro-optically active medium, or where one or more laser beams bypass electro-optically active mediums.

The time-dependent phase shift applied to one or more of the laser beams may break frequency degeneracy of the interacting fields. The time-dependent phase shifts applied to a laser beam(s) by the electro-optically active medium may be dependent upon: the structure of the electro-optically active medium (e.g., its size and shape, its material, or other properties or parameters thereof); the time-dependent refractive index of the electro-optically active medium; the electric field applied to the electro-optically active medium; and combinations thereof. In general, the time-dependent phase shifts may be applied to the laser beams in any coordinated or predetermined manner such that the laser beams are preconditioned for coupling in the coupling stage 140.

As discussed herein, an electric field may induce a change to the time-dependent refractive index of the electro-optically active medium. In certain implementations, the electro-optically active medium is passive, e.g., self-phase modulation. In this manner, the electric field is provided by the laser beam itself passing through the electro-optically active medium, e.g., such that no external power source is needed to apply the electric field to the electro-optically active medium. For example, as shown in FIG. 1, the electric field is provided by the first laser beam 114 such that the first electro-optically active medium 122 is passive, which is why no other power source is shown connected to the first electro-optically active medium 122 in the figure.

In certain implementations, the electric field is also or instead provided by an external power source 102. By way of example, as shown in FIG. 1, the second electric field 103 applied to the second electro-optically active medium 122 is provided by the external power source 102. The external power source 102, or other components of the system 100, may be controlled by a controller 160 as described herein or as otherwise known in the art.

In certain implementations, one or more of the electro-optically active mediums may include a finite lifetime, e.g., similar to the coupling medium 142 as described in more detail below. One or more of the electro-optically active mediums may also or instead be instantaneous.

The first laser beam 114 and the second laser beam 116 may have substantially equal frequencies, i.e., degenerate, in which case the degeneracy is broken in the phase modulation stage. The first laser beam 114 and the second laser beam 116 may instead have substantially different frequencies. As discussed above, one or more of the first laser beam 114 and the second laser beam 116 may include at least one of an electromagnetic field, a beam of light, an electric field, and an energy field.

In addition to the phase modulation stage 120, as described herein, the coherent amplification device 101 may include coupling stage 140 for transferring energy and spatial phase information between laser beams, e.g., the first laser beam 114 and the second laser beam 116. The coupling stage 140 may also or instead be structurally configured to provide a finite lifetime through population redistribution in resonant media, either from exciton, i.e., excited state, and/or charge carrier generation. Thus, population redistribution refers to a possible mechanism for the finite lifetime in the nonlinear refractive index in the coupling medium 142. Other sources are possible for providing a finite lifetime.

The coupling stage 140 may include a coupling medium 142. The coupling medium 142 may have a time-dependent and intensity-dependent refractive index, e.g., Kerr media, with a finite lifetime. The coupling medium 142 may be structurally configured such that an interference pattern of two or more laser beams overlapping within the coupling medium 142 is written into the coupling medium 142 through the time-dependent and intensity-dependent refractive index to generate a holographic grating 144 based on the interference pattern. Further, the coupling medium 142 may be structurally configured such that its finite lifetime facilitates a transfer of energy and spatial phase information between the laser beams, which have been preconditioned to be non-degenerate in frequency. For example, in the coherent amplification device 101 of FIG. 1, the interference pattern of the non-frequency degenerate first laser beam 114 and the second laser beam 116 overlapping within the coupling medium 142 is written into the coupling medium 142 through the time-dependent and intensity-dependent refractive index to generate a holographic grating 144 based on the interference pattern, and the finite lifetime of the coupling medium 142 facilitates a transfer of energy and spatial phase information between the first laser beam 114 and the second laser beam 116. The coupling stage 140 may allow for an arbitrary angle of incidence between laser beams, e.g., the first laser beam 114 and the second laser beam 116.

The holographic gating 144 may lag in time relative to the interference pattern of laser beams within the coupling medium 142, e.g., because of the finite lifetime of the coupling medium 142 and the non-degeneracy of the fields. And the holographic gating 144 lagging in time relative to the interference pattern may cause the transfer of energy and spatial phase information between laser beams within the coupling medium 142 (e.g., the first laser beam 114 and the second laser beam 116 shown in the figure). In certain implementations, the first laser beam 114, the second laser beam 116, and the holographic grating 144 are mutually coherent.

In certain implementations, the holographic grating 144 is persistent. For example, the holographic grating 144 may be sustained within a range of about 1 nanosecond through about 100 milliseconds. Other ranges are also or instead possible.

The interference pattern may include a pattern vector, i.e., the sum of the propagation vectors of the two fields, and along this vector the pattern may travel because of the preconditioning of at least one of the laser beams in the phase modulation stage 120. The moving of the pattern may generate a holographic grating vector of the holographic grating 144. The holographic grating 144 may be substantially identical to the interference pattern, but lagging in time, e.g., because of the finite lifetime of the coupling medium 142 and the preconditioned non-degeneracy. The interference pattern may include its own temporal and/or spatial dependence from the preconditioning of at least one of the laser beams, e.g., the first laser beam 114.

A phase shift may be present between the interference pattern and the holographic grating 144 due to the time lag. In certain implementations, the phase shift is about 90 degrees, where a 90-degree phase shift may be optimum. Other phase shifts are also possible.

The coupling medium 142 may include an isotropic medium or a Kerr medium. The coupling medium 142 may also or instead be centrosymmetric. In certain implementations, the coupling medium 142 does not comprise a photorefractive medium—e.g., the coupling medium 142 may completely lack photorefractive materials and the use of the photorefractive effect in performing the two-beam coupling. In certain implementations, asymmetric energy is not used to generate a phase mismatch between the first laser beam 114 and the second laser beam 116. Also, or instead, a relative time delay may not be used to generate a phase mismatch between the first laser beam 114 and the second laser beam 116.

In certain implementations, the coupling medium 142 may be structurally configured to receive laser beams (e.g., the first laser beam 114 and the second laser beam 116) substantially simultaneously when the coherent amplification device 101 is in use. The coupling medium 142 may also or instead be structurally configured to provide the transfer of energy and spatial phase information between the first laser beam 114 and the second laser beam 116 in a range of about 1-100 nanoseconds. Other ranges are also or instead possible.

The system 100 may include a controller 160 as discussed above, e.g., for applying the electric field(s) to the phase modulation stage 120, for activating the laser source(s), for adjusting a direction of energy transfer between laser beams, and for performing other controlling functionality for the system 100 or coherent amplification device 101. For example, through the controller 160 or otherwise, the phase modulation stage 120 may be adjustable to control a direction of energy transfer between the first laser beam 114 and the second laser beam 116.

The controller 160 may include, or otherwise be in communication with, a processor 162 and a memory 164. The controller 160 may be electronically coupled (e.g., wired or wirelessly) in a communicating relationship with one or more of the components of the system 100. In general, the controller 160 may be operable to control one or more of the components of the system 100, e.g., to control the external power source 102, the second electric field 103, a laser source, the phase modulation stage 120, the coupling stage 140, and combinations thereof. In general, the controller 160 may be electrically coupled in a communicating relationship, e.g., an electronic communication, with any of the components of the system 100. The controller 160 may include any combination of software and/or processing circuitry suitable for controlling the various components of the system 100 described herein including without limitation processors 162, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In certain implementations, the controller 160 may include the processor 162 or other processing circuitry with sufficient computational power to provide related functions such as executing an operating system, providing a graphical user interface (e.g., to a display coupled to the controller 160 or another component of the system 100), set and provide rules and instructions for operation of a component of the system 100, convert sensed information into instructions, and operate a web server or otherwise host remote operators and/or activity through a communications interface 182 such as that described below.

The processor 162 may be any as described herein or otherwise known in the art. The processor 162 may be included on the controller 160, or it may be separate from the controller 160, e.g., it may be included on a computing device 170 in communication with the controller 160 or another component of the system 100. In an implementation, the processor 162 is included on or in communication with a server that hosts an application for operating and controlling components of the system 100.

The memory 164 may be any as described herein or otherwise known in the art. The memory 164 may contain computer code and may store data such as instructions for controlling the stages of the coherent amplification device 101, or data related to performance of the coherent amplification device 101 or system 100. The memory 164 may contain computer executable code stored thereon that provides instructions for the processor 162 for implementation. The memory 164 may include a non-transitory computer readable medium.

The system 100 may include a computing device 170 in communication with one or more of the components of the system 100 including without limitation the controller 160. The computing device 170 may include a user interface, e.g., a graphical user interface, a text or command line interface, a voice-controlled interface, and/or a gesture-based interface. In general, the user interface may create a suitable display on the computing device 170 for operator interaction. In implementations, the user interface may control operation of one or more of the components of the system 100, as well as provide access to and communication with the controller 160, processor 162, and other resources. The computing device 170 may thus include any devices within the system 100 operated by operators or otherwise to manage, monitor, communicate with, or otherwise interact with other participants in the system 100. This may include desktop computers, laptop computers, network computers, tablets, smartphones, or any other device that can participate in the system 100 as contemplated herein. In an implementation, the computing device 170 is integral with another participant in the system 100.

The data network 180 may be any network(s) or internetwork(s) suitable for communicating data and control information among participants in the system 100. This may include public networks such as the Internet, private networks, telecommunications networks such as the Public Switched Telephone Network or cellular networks using third generation (e.g., 3G or IMT-2000), fourth generation (e.g., LTE (E-UTRA) or WiMAX-Advanced (IEEE 802.16m) and/or other technologies, as well as any of a variety of corporate area or local area networks and other switches, routers, hubs, gateways, and the like that might be used to carry data among participants in the system 100. The data network 180 may include wired or wireless networks, or any combination thereof. One skilled in the art will also recognize that the participants shown the system 100 need not be connected by a data network 180, and thus can be configured to work in conjunction with other participants independent of the data network 180.

Communication over the data network 180, or other communication between components of the system 100, may be provided via one or more communications interfaces 182. The communications interface 182 may include, e.g., a Wi-Fi receiver and transmitter to allow calculations and the like to be performed on a separate computing device 170. More generally, the communications interface 182 may be suited such that any of the components of the system 100 can communicate with one another. Thus, the communications interface 182 may be present on one or more of the components of the system 100. The communications interface 182 may include, or be connected in a communicating relationship with, a network interface or the like. The communications interface 182 may include any combination of hardware and software suitable for coupling the components of the system 100 to a remote device (e.g., a computing device 170 such as a remote computer or the like) in a communicating relationship through a data network 180. By way of example and not limitation, this may include electronics for a wired or wireless Ethernet connection operating according to the IEEE 802.11 standard (or any variation thereof), or any other short or long-range wireless networking components or the like. This may include hardware for short range data communications such as Bluetooth or an infrared transceiver, which may be used to couple into a local area network or the like that is in turn coupled to a data network such as the internet. This may also or instead include hardware/software for a WiMAX connection or a cellular network connection (using, e.g., CDMA, GSM, LTE, or any other suitable protocol or combination of protocols). Additionally, the controller 160 may be configured to control participation by the components of the system 100 in any network to which the communications interface 182 is connected, such as by autonomously connecting to the data network 180 to retrieve updates and the like.

The system 100 may include other hardware 190. In certain implementations, the other hardware 190 may include a camera, a power source, a sensor, a database, and the like. The other hardware 190 may also or instead include input devices such as a keyboard, a touchpad, a computer mouse, a switch, a dial, a button, and the like, as well as output devices such as a display, a speaker or other audio transducer, light emitting diodes or other lighting or display components, and the like. Other hardware 190 of system 100 may also or instead include a variety of cable connections and/or hardware adapters for connecting to, e.g., external computers, external hardware, external instrumentation or data acquisition systems, and the like.

A salient feature of two-beam coupling shown in FIG. 1 and as described herein may include the phase shift between the interference pattern and the resultant grating. This may be achieved without a space-charge field in non-degenerate fields by way of a nonlinear refractive index that has a finite lifetime, i.e., that is not instantaneous. There are many possible physical mechanisms that a have finite lifetime—e.g., a comprehensive list can be found in Sutherland, R.L., "Nonlinear Index of Refraction," HANDBOOK OF NONLINEAR OPTICS, New York, N.Y., Marcel Dekker, Inc., p. 301 (1996), which is hereby incorporated by reference. Non-photorefractive two-beam coupling of the prior art often exhibited weak coupling, which was likely due to the common picosecond excitation employed. However, the effect can be much larger using nanosecond pump sources and materials with strong population redistribution, e.g., as described in Slagle, J., et al., "Degenerate Frequency Two Beam Coupling in Organic Media via Phase Modulation with Nanosecond Pulses," J. OPT. SOC. AM. B, Vol. 33, pp. 180-188 (2016), which is hereby incorporated by reference. There may be at least two reasons for this. One, because the nonlinearity of population redistribution is cumulative, a longer timescale excitation may result in a deeper modulation depth in the grating and thus stronger coupling. Two, because the optimum phase shift between the grating and interference pattern may be 90 degrees and may not be automatically satisfied in this case (e.g., unlike with the photorefractive effect), this phase shift evolves in time and therefore a longer timescale allows this phase shift to reach its optimum value.

Thus, two-beam coupling in the system 100 of FIG. 1 may occur as follows. The electric fields (e.g., from the laser beams or from other power sources) may generate/induce a time-dependent change in the refractive index of one or more of the electro-optically active mediums in the preconditioning stage 120. This change in refractive index may also result in a time-dependent phase shift by way of phase modulation that causes the interference pattern to then travel along the grating vector in the coupling stage 140. Due the finite lifetime of the nonlinear refractive index, e.g., population redistribution, the grating may lag in time relative to the interference pattern and cause the necessary phase shift between interference pattern and refractive index grating for coupling to occur in the coupling medium 142.

There may be a number of advantages to phase modulation mediated two beam coupling. For example, there may be no requirement against centrosymmentric media, unlike some techniques of the prior art. In fact, the materials used in the coherent amplification device 101 may be isotropic, which can allow for large-scale manufacturing and arbitrary shapes. This can be a single dye in solution, homogeneously dispersed in a polymer matrix, or even amorphous, polycrystalline, or fully crystalline semiconductors. By way of further example, the nonlinearity of the coherent amplification device 101 may be completely passive, i.e., without a need for any externally applied electric fields thus reducing complexity, size, weight, and power requirements. Also, the gratings used in the coherent amplification device 101 may be formed as light is absorbed, which means coupling can occur on the nanosecond time scale thus greatly enhancing the temporal responsivity and the data transfer bandwidth of potential applications. However, it is possible that higher pump intensities may be needed to achieve efficient coupling. For example, if using photon absorbing materials with a refractive index change that is quadratic with irradiance, e.g., Kerr media, higher pump intensities may be needed to achieve a predetermined coupling. But this may be overcome by using a coupling medium 142 with a relatively weak linear absorption to generate the excitons or charge carriers.

The system 100 of FIG. 1 may thus accomplish coherent amplification by employing phase modulation-mediated two-beam coupling. The efficiency of the system 100 may be increased (e.g., compared to other coupling systems and devices) through the compartmentalization of the two functions of the nonlinear refractive index. That is, by first prewriting an optimum time-dependent phase modulation into the field prior to coupling, this may allow for any arbitrary angle of incidence between the two fields. Also, this can enable the system 100 to not require asymmetric energy or relative time delay to generate the phase mismatch, while allowing for the choice in the direction of energy transfer by structuring the relative phase modulation between the fields. As stated above, the phase modulation media and the coupling media need not be the same in composition. Additionally, the phase modulation stage 120 may only have a sufficiently fast electro-optic effect to generate the desired phase modulation, and need not be persistent. The coupling stage 140 may include a persistent nonlinearity, e.g., in which one possibility is population redistribution resulting from exciton and charge carrier generation, but any physical mechanism that has a nonlinear refractive index with a finite lifetime could be used.

Figure 2:
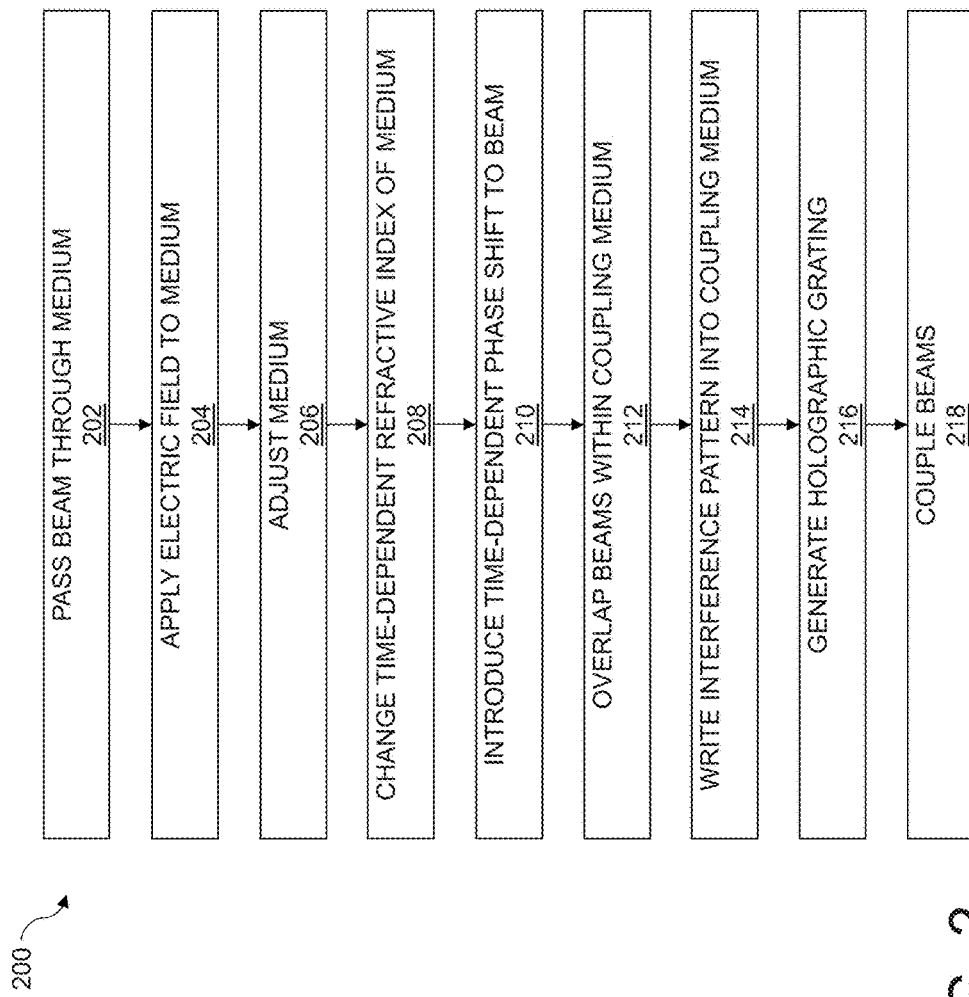
FIG. 2 is a flow chart of a method for coherent amplification, in accordance with a representative embodiment.

FIG. 2 is a flow chart of a method for coherent amplification, in accordance with a representative embodiment. The method 200 may generally include the functionality of system or device for coherent amplification as described herein.

As shown in box 202, the method 200 may include passing a first laser beam through a first electro-optically active medium. The method 200 may also include passing a second laser beam through the first electro-optically active medium, or passing a second laser beam through a second electro-optically active medium.

As shown in box 204, the method 200 may include applying an electric field to one or more of the electro-optically active mediums, e.g., applying an electric field to the first electro-optically active medium to change the time-dependent refractive index of the first electro-optically active medium. The electric field may be applied from the laser beam, e.g., simply by passing the first laser beam through the first electro-optically active medium. Applying the electric field may also or instead include applying an external electric field provided by an external power source to one or more of the electro-optically active mediums, e.g., to the first electro-optically active medium to change the time-dependent refractive index of the first electro-optically active medium.

As shown in box 206, the method 200 may include adjusting one or more of the electro-optically active mediums, e.g., adjusting the first electro-optically active medium to control a direction of energy transfer between the first laser beam and the second laser beam.

As shown in box 208, the method 200 may include changing a time-dependent refractive index of one or more of the electro-optically active mediums, e.g., the first electro-optically active medium. As discussed above, changing the time-dependent refractive index of the first electro-optically active medium may be caused by passing the first laser beam through the first electro-optically active medium. Similarly, changing the time-dependent refractive index of the second electro-optically active medium may be caused by passing the second laser beam through the second electro-optically active medium. An external electric field may also or instead be applied to one or more of the electro-optically active mediums to change a time-dependent refractive index thereof.

As shown in box 210, the method 200 may include introducing a time-dependent phase shift to one or more laser beams, e.g., the first laser beam.

As shown in box 212, the method 200 may include overlapping the first laser beam with a second laser beam within a coupling medium having a time-dependent and intensity-dependent refractive index with a finite lifetime.

As shown in box 214, the method 200 may include writing an interference pattern of the first laser beam and the second laser beam into the coupling medium through the time-dependent and intensity-dependent refractive index.

As shown in box 216, the method 200 may include generating a traveling holographic grating in the coupling medium based on the interference pattern generated by the preconditioned laser beams.

As shown in box 218, the method 200 may include coupling laser beams, e.g., the first and second laser beams. This may include transferring energy and spatial phase information between the first laser beam and the second laser beam, which is facilitated by the finite lifetime of the coupling medium and non-degenerate preconditioning. This may also or instead include a finite lifetime provided by population redistribution in resonant (Kerr) media, i.e., media in which the laser beams would generate electronic transitions or generate charge carriers.

Figure 3:
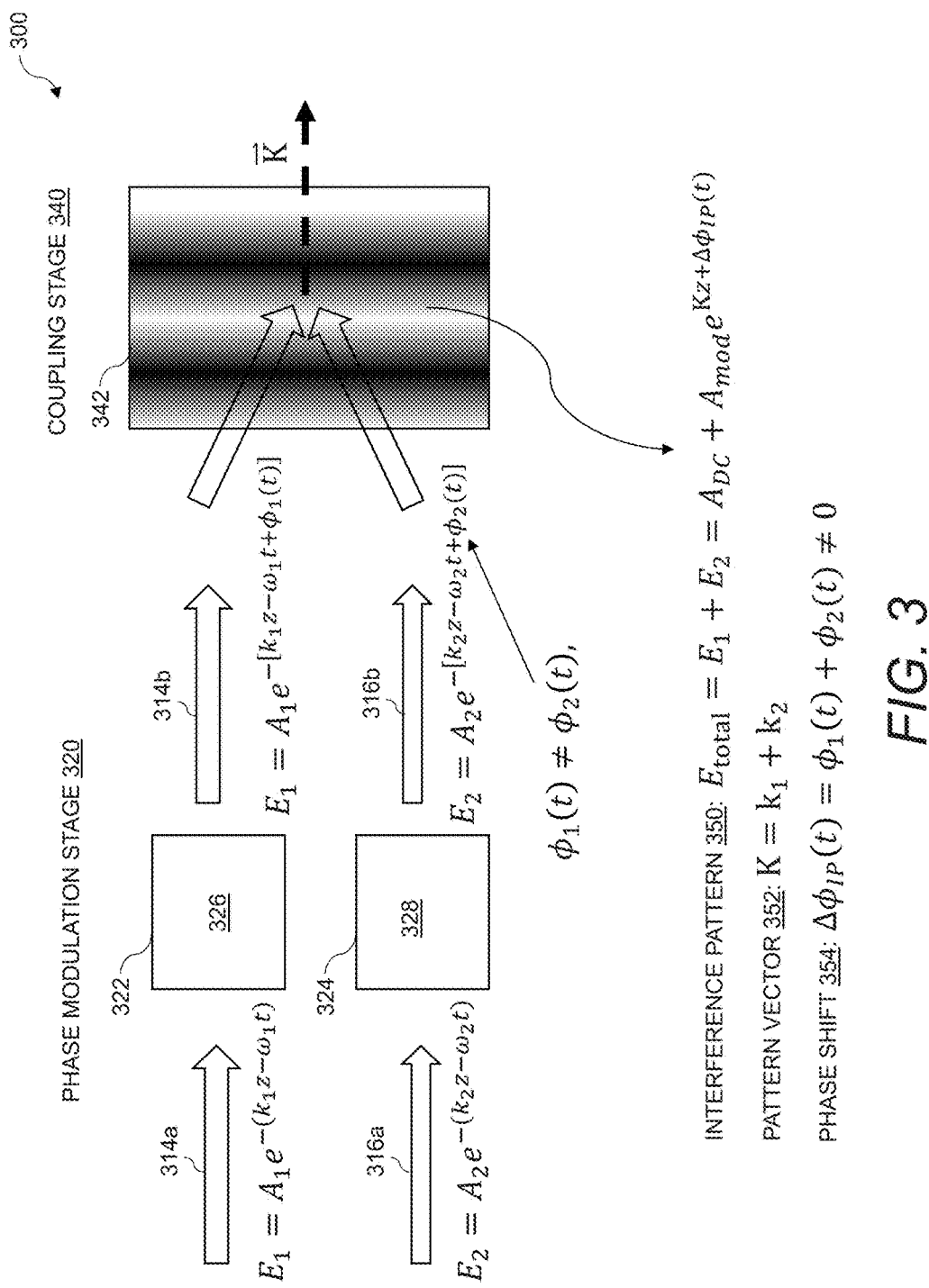
FIG. 3 illustrates a coherent amplification system, in accordance with a representative embodiment.

In order to better understand the present teachings, FIG. 3 illustrates a coherent amplification system 300, in accordance with a representative embodiment. The system 300 may be the same or similar to that shown in FIG. 1, but includes additional information and mathematical relationships to further explain the system 300 and its components. Similar to the system 100 of FIG. 1, the system 300 of FIG. 3 includes a first laser beam 314a and a second laser beam 316a to be coupled in a coupling stage 340, where one or more of the first laser beam 314a and the second laser beam 316a is pre-conditioned in a phase modulation stage 320. The phase modulation stage 320 may include a first electro-optically active medium 322 having a first time-dependent refractive index 326, and a second electro-optically active medium 324 having a second time-dependent refractive index 328. The coupling stage 340 may include a coupling medium 342.

The first laser beam 314a and the second laser beam 316a, prior to preconditioning, may be represented by:

$$E_1 = A_1 e^{-(k_1 z - \omega_1 t)} \quad \text{Eq. 1,}$$

for the first laser beam 314a, and $$E_2 = A_2 e^{-(k_2 z - \omega_2 t)} \quad \text{Eq. 2,}$$

for the second laser beam 316a.

Prior to preconditioning, the propagation vectors of the first laser beam 314a and the second laser beam 316a may or may not be equal, i.e., $k_1 \neq k_2$ or $k_1 = k_2$.

Further, in the degenerate frequency case for the laser beams: $\omega_1 = \omega_2$.

In the non-degenerate frequency case for the laser beams: $\omega_1 \neq \omega_2$.

For both laser beams, $A_1$ and $A_2 \neq 0$.

After preconditioning, the preconditioned first laser beam 314b and the preconditioned second laser beam 316b may be represented by:

$$E_1 = A_1 e^{-[k_1 z - \omega_1 t + \phi_1(t)]} \quad \text{Eq. 3,}$$

for the preconditioned first laser beam 314b, and $$E_2 = A_2 e^{-[k_2 z - \omega_2 t + \phi_2(t)]} \quad \text{Eq. 4,}$$

for the preconditioned second laser beam 316b.

As shown in Eq. 3 and Eq. 4 above, the preconditioned first laser beam 314b and the preconditioned second laser beam 316b may result in time dependent phase shift, i.e., $\phi_1(t) \neq \phi_2(t)$, thereby breaking degeneracy in the degenerate frequency case.

In the coupling stage 342, the preconditioned laser beams may be overlapped to generate an interference pattern 350, which may be represented by a static (DC) and a modulating (mod) amplitudes such as:

$$E_{total} = E_1 + E_2 = A_{DC} + A_{mod} e^{Kz + \Delta\phi_{IP}(t)} \quad \text{Eq. 5}$$

The pattern vector 352 may be represented by:

$$K = k_1 + k_2 \quad \text{Eq. 6}$$

The time dependent phase shift 354 between fields (non-degeneracy) results in an interference pattern that travels along the pattern vector and may be represented by:

$$\Delta\phi_{IP}(t) = \phi_1(t) + \phi_2(t) \neq 0 \quad \text{Eq. 7}$$

Figure 4:
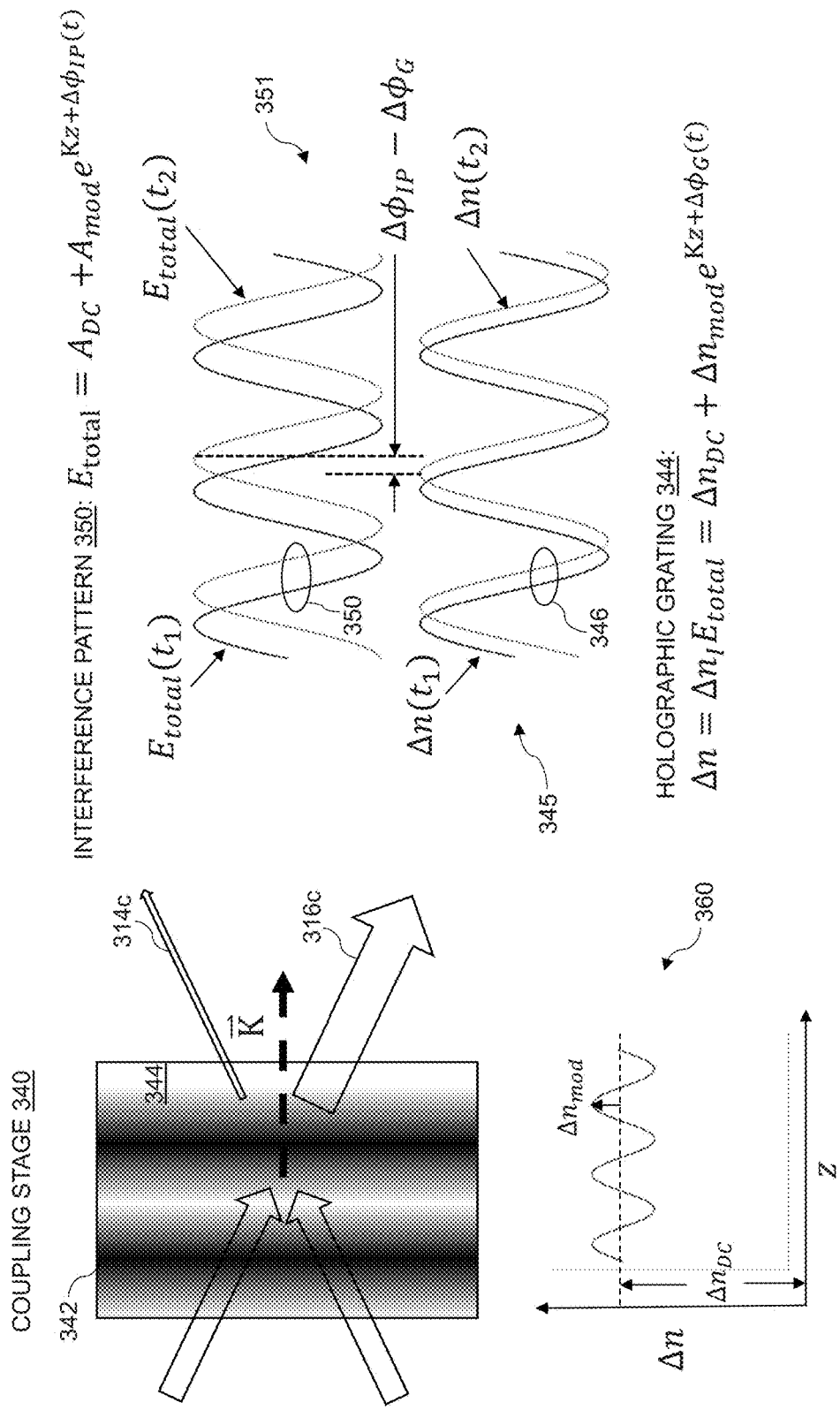
FIG. 4 illustrates a coupling stage of a coherent amplification system, in accordance with a representative embodiment.

FIG. 4 illustrates a coupling stage 340 of a coherent amplification system 300, and in particular includes further information on the coupling stage 340 shown in the system 300 of FIG. 3. Specifically, FIG. 4 shows the holographic grating 344, in both representative and graphical form, as well as the post-coupling first laser beam 314c and the post-coupling second laser beam 316c after passing through the coupling medium 342.

The holographic grating 344 may be represented by:

$$\Delta n = \Delta n_I E_{total} = \Delta n_{DC} + \Delta n_{mod} e^{Kz + \Delta\phi_G(t)} \quad \text{Eq. 8}$$

In Eq. 8, $\Delta n_I$ is the intensity dependent refractive index of the coupling medium 342. Coupling occurs when $\Delta\phi_{IP} - \Delta\phi_G \neq 0$ (time lag), and coupling may be optimum when $\Delta\phi_{IP} - \Delta\phi_G = 90°$.

$\Delta\phi_{IP} - \Delta\phi_G \neq 0$ may occur because of the finite lifetime of $\Delta n_I$. The interference pattern 350 travels in time as shown in the first graphical representation 351. As shown in the first graphical representation 351, the pattern moves along the pattern vector from $t_1$ to $t_2$ due to $\Delta\phi_{IP}(t)$. This dynamic pattern is written into the coupling media (holographic grating 344) by way of the intensity dependent refractive index, i.e., the product $\Delta n_I E_{total}$, but the pattern lags in time due to the finite lifetime (persistence) of the intensity dependent refractive index. This is shown in the second graphical representation 345 depicting the grating pattern 346, where the grating pattern 346 does not travel as far as the interference pattern 350 in the same time period. This difference is what facilitates energy and spatial phase transfer between the fields.

Eq. 8 also results in a static (DC) component and a modulating (mod) component as represented in the third graphical representation 360. The modulating component, or modulation depth, also may accumulate and grow in time due to the finite lifetime of the intensity dependent refractive index, thus increasing the coupling efficiency.

As described herein, the devices, systems, and techniques may be used for digital holography. By way of example, the techniques described herein may be used to amplify a digital holographic signal, e.g., as a replacement for existing devices using a photorefractive crystal such as Rh:BaTiO3. For example, the techniques described herein may be used in replacement of the techniques described in Nektarios Koukourakis et al., "Photorefractive Two-Wave Mixing for Image Amplification in Digital Holography," OPTICS EXPRESS, Vol. 19, No. 22 (2011) (hereinafter "Koukourakis"), which is hereby incorporated by reference. Specifically, the photorefractive crystal described in Koukourakis may be replaced with an isotropic nonlinear material, where a pump's temporal phase is preconditioned with a specific time-dependent phase delay function to facilitate coherent energy transfer into the object beam, thereby providing amplification of the object beam.

By way of further example, it may be possible that the techniques described herein may be used to replace another application in which a photorefractive crystal is performing two-wave mixing. As described herein, a benefit of using an isotropic material may include its temporal bandwidth, e.g., where coupling can occur in nanoseconds, meaning techniques described herein could be used in the 100s of MHz to GHz bandwidths, such as in real-time digital holography. Current photorefractive materials generally have limited temporal bandwidth as shown by P. A. Blanche et al., "Advances in Photorefractive Polymers and Applications," LIGHT MANIPULATING ORGANIC MATERIALS AND DEVICES II, Vol. 9564 (2015), which is hereby incorporated by reference. In general, much higher efficiencies (e.g., nearing 70% or more) are possible using techniques described herein than with current photorefractive techniques, which may only have efficiencies of a few percent on the same time scale. The isotropic media may also be non-crystalline, and therefore these coupling media can be much larger and include less intrinsic scattering (beam-fanning) using techniques described herein.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A coherent amplification device, comprising:
    a phase modulation stage for preconditioning a laser beam traveling therethrough, the phase modulation stage comprising:
        at least a first electro-optically active medium structurally configured for passing at least a first laser beam therethrough, the first electro-optically active medium having a time-dependent refractive index manipulatable by an electric field to change the time-dependent refractive index thereby introducing a time-dependent phase shift to the first laser beam when the first laser beam is passed therethrough; and
    a coupling stage for transferring energy and spatial phase information between the first laser beam and a second laser beam, the coupling stage comprising:
        a coupling medium comprising a time-dependent and intensity-dependent refractive index with a finite lifetime, where an interference pattern of the first laser beam and the second laser beam overlapping within the coupling medium is written into the coupling medium through the time-dependent and intensity-dependent refractive index to generate a holographic grating based on the interference pattern, and where the finite lifetime of the coupling medium and the preconditioning of at least the first laser beam facilitates a transfer of energy and spatial phase information between the first laser beam and the second laser beam.

2. The coherent amplification device of claim 1, where the coupling medium comprises an isotropic medium.

3. The coherent amplification device of claim 1, where the coupling medium does not comprise a photorefractive medium.

4. The coherent amplification device of claim 1, where the holographic grating lags in time relative to the interference pattern causing the transfer of energy and spatial phase information between the first laser beam and the second laser beam.

5. The coherent amplification device of claim 1, where the interference pattern is moving in a direction of a pattern vector because of temporal preconditioning of at least the first laser beam in the phase modulation stage.

6. The coherent amplification device of claim 5, where the moving of the interference pattern generates the holographic grating, the holographic grating substantially identical to the interference pattern but lagging in time because of the finite lifetime of the coupling medium.

7. The coherent amplification device of claim 1, where a phase shift is present between the interference pattern and the holographic grating.

8. The coherent amplification device of claim 1, where the electric field in the phase modulation stage is provided by the first laser beam such that the first electro-optically active medium is passive.

9. The coherent amplification device of claim 1, where the first electro-optically active medium comprises a finite lifetime.

10. The coherent amplification device of claim 1, where the first electro-optically active medium is instantaneous.

11. The coherent amplification device of claim 1, where one or more of the first laser beam and the second laser beam comprises at least one of an electromagnetic field, a beam of light, an electric field, and an energy field.

12. The coherent amplification device of claim 1, where the coupling stage is structurally configured to receive the first laser beam and the second laser beam substantially simultaneously.

13. The coherent amplification device of claim 1, where the phase modulation stage and the coupling stage are structurally configured to preserve a phase of one or more of the first laser beam and the second laser beam through the coherent amplification device.

14. The coherent amplification device of claim 1, where the coupling medium is structurally configured to provide the transfer of energy and spatial phase information between the first laser beam and the second laser beam in a range of about 1-100 nanoseconds.

15. The coherent amplification device of claim 1, where the holographic grating is sustained for a range of about 1 nanosecond through about 100 milliseconds.

16. A method, comprising:
    passing a first laser beam through a first electro-optically active medium;
    changing a time-dependent refractive index of the first electro-optically active medium;
    introducing a time-dependent phase shift to the first laser beam;
    overlapping the first laser beam with a second laser beam within a coupling medium comprising a time-dependent and intensity-dependent refractive index with a finite lifetime;
    writing an interference pattern of the first laser beam and the second laser beam into the coupling medium through the time-dependent and intensity-dependent refractive index;
    generating a holographic grating in the coupling medium based on the interference pattern; and
    transferring energy and spatial phase information between the first laser beam and the second laser beam facilitated by the finite lifetime of the coupling medium and the time-dependent phase shift to at least the first laser beam.

17. The method of claim 16, where changing the time-dependent refractive index of the first electro-optically active medium is caused by the passing of the first laser beam through the first electro-optically active medium.

18. The method of claim 16, further comprising applying an external electric field provided by an external power source to the first electro-optically active medium to change the time-dependent refractive index of the first electro-optically active medium.

19. The method of claim 16, further comprising passing the second laser beam through the first electro-optically active medium.

20. The method of claim 16, further comprising passing the second laser beam through a second electro-optically active medium.

21. The method of claim 16, further comprising providing population redistribution in resonant, Kerr media to act as the finite lifetime in the coupling medium.

22. The method of claim 16, further comprising adjusting the first electro-optically active medium to control a direction of energy transfer between the first laser beam and the second laser beam.

23. A system, comprising:
    one or more laser sources;
    a phase modulation stage for preconditioning a laser beam, the phase modulation stage comprising:
        at least a first electro-optically active medium structurally configured for passing at least a first laser beam from the one or more laser sources therethrough, the first electro-optically active medium having a time-dependent refractive index manipulatable by an electric field to change the time-dependent refractive index thereby introducing a time-dependent phase shift to the first laser beam when the first laser beam is passed therethrough; and a coupling stage for transferring energy and spatial phase information between the first laser beam and a second laser beam, the coupling stage comprising:

a coupling medium comprising a time-dependent and intensity-dependent refractive index with a finite lifetime, the coupling medium structurally configured such that an interference pattern of the first laser beam and the second laser beam overlapping within the coupling medium is written into the coupling medium through the time-dependent and intensity-dependent refractive index to generate a holographic grating based on the interference pattern, where the finite lifetime of the coupling medium and the preconditioning of at least the first laser beam facilitates a transfer of energy and spatial phase information between the first laser beam and the second laser beam.

\* \* \* \* \*